United States Patent
Kumar et al.

(10) Patent No.: US 12,232,218 B2
(45) Date of Patent: Feb. 18, 2025

(54) TECHNIQUES FOR DOWNLOADING MODELS IN WIRELESS COMMUNICATIONS

(71) Applicant: QUALCOMM Incorporated, San Diego, CA (US)

(72) Inventors: Rajeev Kumar, San Diego, CA (US); Gavin Bernard Horn, La Jolla, CA (US); Xipeng Zhu, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/886,381

(22) Filed: Aug. 11, 2022

(65) Prior Publication Data

US 2024/0056798 A1 Feb. 15, 2024

(51) Int. Cl.
*H04W 8/24* (2009.01)
*H04W 48/10* (2009.01)
*H04W 72/23* (2023.01)

(52) U.S. Cl.
CPC .......... *H04W 8/245* (2013.01); *H04W 48/10* (2013.01); *H04W 72/23* (2023.01)

(58) Field of Classification Search
CPC ....... G06N 20/00; H04L 41/16; H04W 24/02; H04W 48/10; H04W 72/23; H04W 8/245
See application file for complete search history.

(56) References Cited

U.S. PATENT DOCUMENTS

| | | | |
|---|---|---|---|
| 2020/0367051 A1 | 11/2020 | Wang et al. | |
| 2022/0342713 A1 | 10/2022 | Shen et al. | |
| 2022/0346132 A1* | 10/2022 | Shen | G06N 20/00 |
| 2023/0006913 A1* | 1/2023 | Lo | H04L 41/0853 |
| 2024/0236826 A1* | 7/2024 | Fan | H04W 28/0925 |

FOREIGN PATENT DOCUMENTS

| | | | |
|---|---|---|---|
| EP | 4087343 | * | 1/2020 |
| WO | 2021142609 A1 | | 7/2021 |
| WO | 2022008037 A1 | | 1/2022 |

OTHER PUBLICATIONS

International Search Report and Written Opinion—PCT/US2023/071894—ISA/EPO—Nov. 28, 2023.

* cited by examiner

*Primary Examiner* — Timothy X Pham
(74) *Attorney, Agent, or Firm* — Arun Swain

(57) ABSTRACT

Aspects described herein relate to receiving, from a network node, a list of supported models or model structures (MS) identifiers (IDs) per machine learning function name (MLFN) or machine learning feature (MLF) at the network node, updating a capability at the UE to an updated capability based on the list of supported models or MS IDs per MLFN or MLF at the network node, and downloading, at the UE and from a model repository, one or more models or MSs per MLFN or MLF based on the updated capability and available resources at the UE. Other aspects relate to transmitting the list of supported models or MS IDs and configuring use of a model or MS ID for a particular MLFN or MLF.

30 Claims, 10 Drawing Sheets

TECHNIQUES FOR DOWNLOADING MODELS IN WIRELESS COMMUNICATIONS

FIELD OF THE DISCLOSURE

Aspects of the present disclosure relate generally to wireless communication systems, and more particularly, to techniques for downloading artificial intelligence (AI)- or machine learning (ML)-based models.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive, from a network node, a list of supported models or model structures (MS) identifiers (IDs) per machine learning function name (MLFN) or machine learning feature (MLF) at the network node, update a capability at the apparatus to an updated capability based on the list of supported models or MS IDs per MLFN or MLF at the network node, and download, from a model repository, one or more models or MSs per MLFN or MLF based on the updated capability and available resources at the apparatus.

According to another aspect, an apparatus for wireless communication, is provided that includes a processor; memory coupled with the processor, and instructions stored in the memory. The instructions are operable, when executed by the processor, to cause the apparatus to transmit, for a UE, a list of supported models or MS IDs per MLFN or MLF at the apparatus, and receive, for the UE and based on the list of supported models or MS IDs, a request to download, from a model repository, one or more models or MSs based on the list of supported models or MS IDs at the apparatus.

According to another aspect, a method for wireless communication at a UE is provided that includes receiving, from a network node, a list of supported models or MS IDs per MLFN or MLF at the network node, updating a capability at the UE to an updated capability based on the list of supported models or MS IDs per MLFN or MLF at the network node, and downloading, at the UE and from a model repository, one or more models or MSs per MLFN or MLF based on the updated capability and available resources at the UE.

In another aspect, a method for wireless communication at a network node is provided that includes transmitting, for a UE, a list of supported models or MS IDs per MLFN or MLF at the network node, and receiving, for the UE and based on the list of supported models or MS IDs, a request to download, from a model repository, one or more models or MSs based on the list of supported models or MS IDs at the network node.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
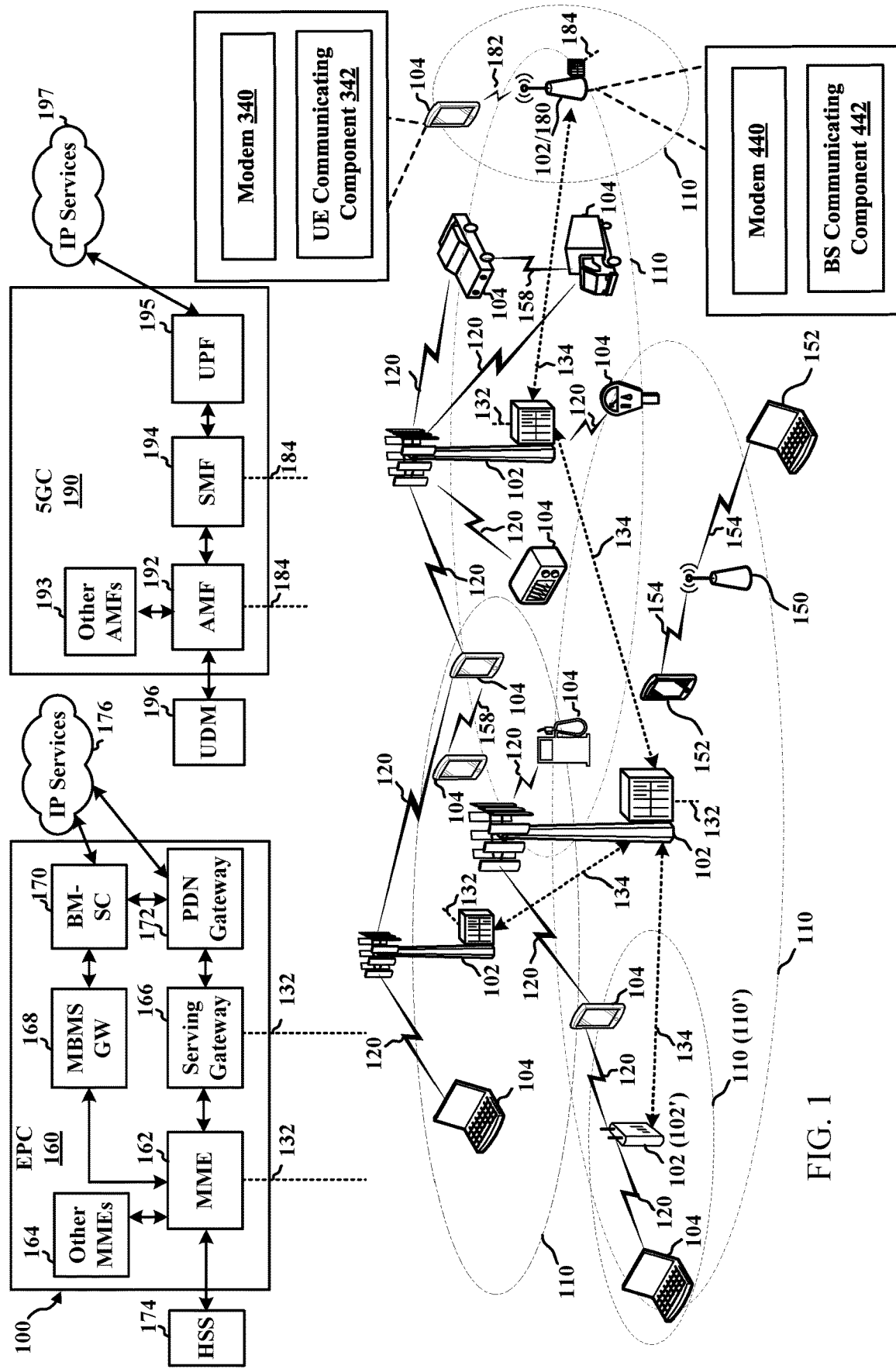
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to downloading artificial intelligence (AI)- or machine learning (ML)-based models in wireless communications. In some wireless communication technologies, such as fifth generation (5G) new radio (NR), AI or ML can be used in performing various procedures, such as for encoding and transmitting channel state information (CSI) feedback, performing beam management, performing high positioning accuracy for devices indoor and outdoor, performing dynamic discontinuous receive (DRX) switching, or other physical layer procedures, media access control (MAC) layer procedures, etc. In some examples, a user equipment (UE) and/or network node can acquire models for performing the procedures to decrease an amount of information to be transmitted as part of the procedures. This can improve efficiency in performing the procedures, which may allow for increased data throughput, improved resource utilization, etc. In some examples, of AI/ML based procedures, multiple models can be defined per machine learning function name (MLFN) or machine learning feature (MLF), where each MLFN may be an identifier that corresponds to a machine learning function that can be performed between a UE and network node. A MLF can also indicate a machine learning feature or function that can be performed between the UE and network node. A single ML structure (MS) may have multiple parameter sets (PS)—e.g., each PS can have different weights.

With further enhancements in AI/ML-based procedures, more features may be introduced, which may be associated with a large number of models and associated parameter sets. A UE, however, may have limited memory to store MSs or PSs. Therefore, aspects described herein relate to an efficient mechanism for UE capability signaling and/or dynamic model download so that the UE can store the models it can use or prefers to use. In an example, support for MSs or PSs can be dynamically updated at a UE or network, and as such, aspects described herein can facilitate the UE downloading desired MSs or PSs at runtime. In addition, actual hardware such as memory, processor, and hardware accelerator may be limited at the UE. Therefore, a limited number of models or MSs and corresponding PSs may be available at the UE for usage. In some aspects described herein, MSs or PSs can be dynamically downloaded and removed (from memory) based on the available hardware at UE. Downloading of the models at the UE can be out-of-band or on-demand in accordance with aspects described herein. In any case, the dynamic downloading of models can allow the UE to store and use desired models, MSs and PSs as they become available, and refrain from storing other unused models to free memory and processing resources at the UE.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for downloading models or MS IDs supported or to be used for one or more MLFNs or MLFs, in accordance with aspects described herein. In addition, some nodes may have a modem 440 and BS communicating component 442 for configuring a node to download models or MS IDs supported or to be used for one or more MLFNs or MLFs, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can transmit a list of models or MS IDs supported per MLFN or MLF. The UE communicating component 342 can receive, from a network node (e.g., such as or via a base station 102) the list of models or MS IDs supported per MLFN or MLF. The UE communicating component 342 can update its capabilities based on the received list. In one example, UE communicating component 342 can use this list to download one or more models or MSs, e.g., from a model repository (MR), and can update capability information to the network node to receive a configured model or MS ID (and/or PS) to use for one or more MLFNs or MLFs. BS communicating component 442, for example, can receive the updated capability information from the UE 104 and can configure one or more of the models or MSs for use by the UE 104. In another example, UE communicating component 342 can use the list received from the network node to update capability information to the network node, and the network node can select one or more models or MS IDs for the UE 104 to use for one or more MLFNs or MLFs. For example, BS communicating component 442 can indicate the selected one or more models or MS IDs to the UE 104, and UE communicating component 342 can download the selected one or models or MS IDs, if needed, e.g., from the MR. UE communicating component 342 can indicate to the BS communicating component 442 when the one or more models or MSs are ready for use.

Figure 2:
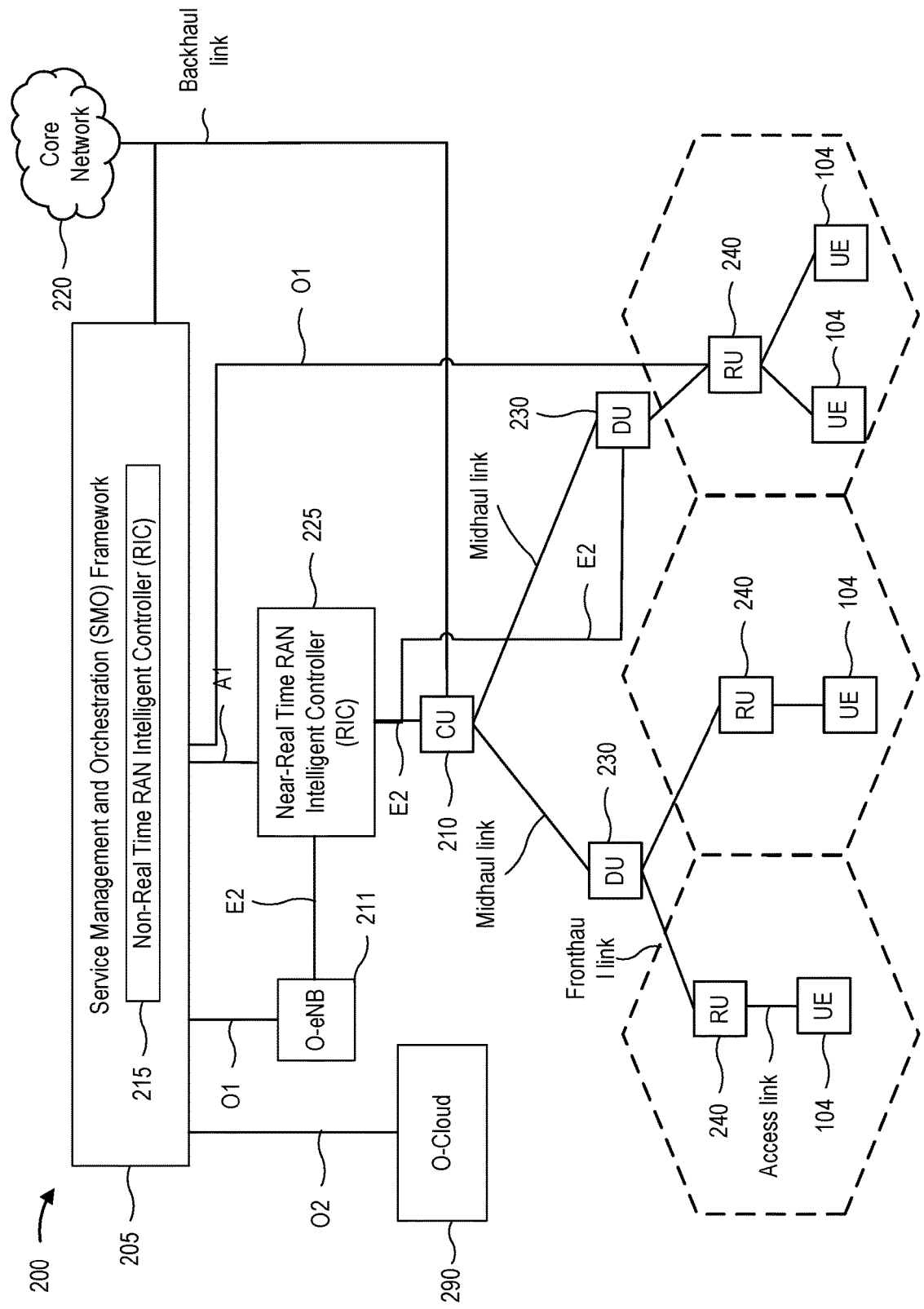
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can send lists of supported models or MS IDs to UEs via one or more DUs 230, receive UE capability information via one or more DUs 230, select models or MSs for a UE via one or more DUs 230, and/or the like. In another example, BS communicating component 442, as described herein, can be at least partially implemented within a DU 230, and can send lists of supported models or MS IDs to UEs via one or more RUs 240, receive UE capability information via one or more RUs 240, select models or MSs for a UE via one or more RUs 240, and/or the like.

Turning now to FIGS. 3-10, aspects are depicted with reference to one or more components and one or more methods that may perform the actions or operations described herein, where aspects in dashed line may be optional. Although the operations described below in FIGS. 5-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
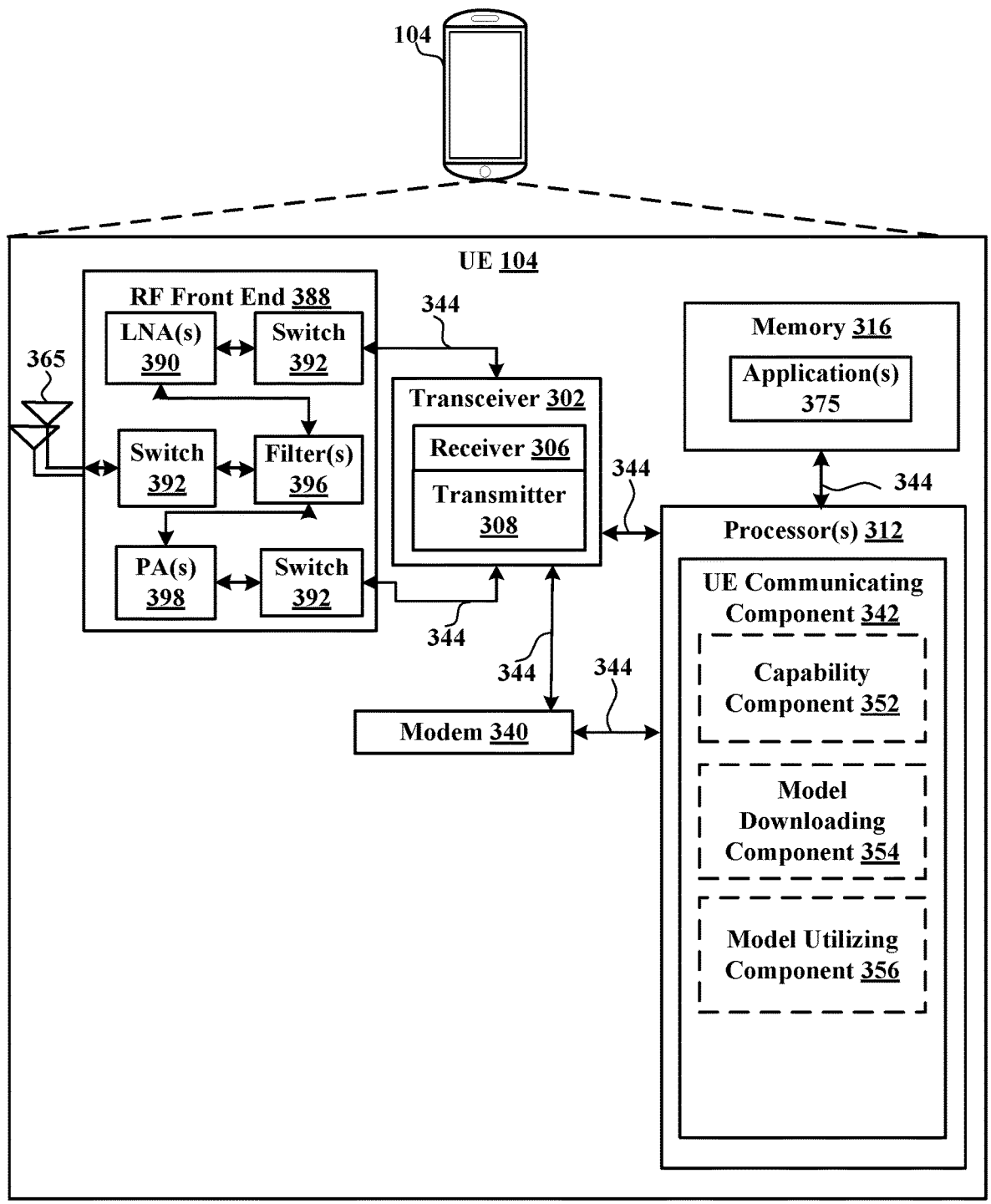
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for downloading models or MS IDs supported or to be used for one or more MLFNs or MLFs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a capability component 352 for indicating UE capabilities with respect to models or MS IDs, a model downloading component 354 for downloading one or more models or MSs from a MR, and/or a model utilizing component 356 for utilizing or indicating utilization or preparation of a model or MS for use for one or more MLFNs or MLFs, in accordance with aspects described herein.

In an aspect, the processor(s) 312 may correspond to one or more of the processors described in connection with the UE in FIG. 10. Similarly, the memory 316 may correspond to the memory described in connection with the UE in FIG. 10.

Figure 4:
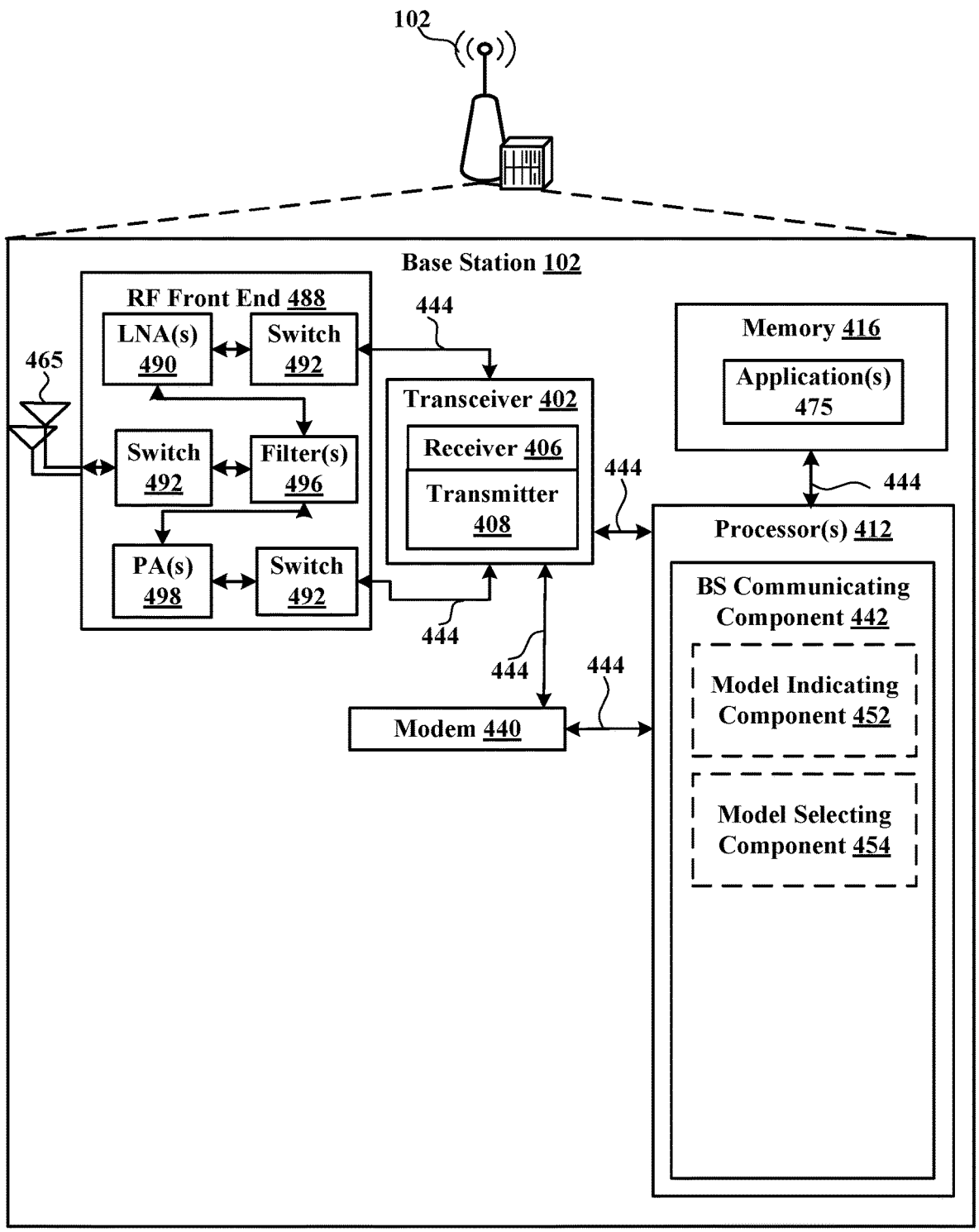
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for configuring a node to download models or MS IDs supported or to be used for one or more MLFNs or MLFs, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a model indicating component 452 for indicating a list of supported models or MS IDs for one or more MLFNs or MLFs, and/or a model selecting component 454 for selecting a model or MS for a UE to use for one or more MLFNs or MLFs, in accordance with aspects described herein.

In an aspect, the processor(s) 412 may correspond to one or more of the processors described in connection with the base station in FIG. 10. Similarly, the memory 416 may correspond to the memory described in connection with the base station in FIG. 10.

Figure 5:
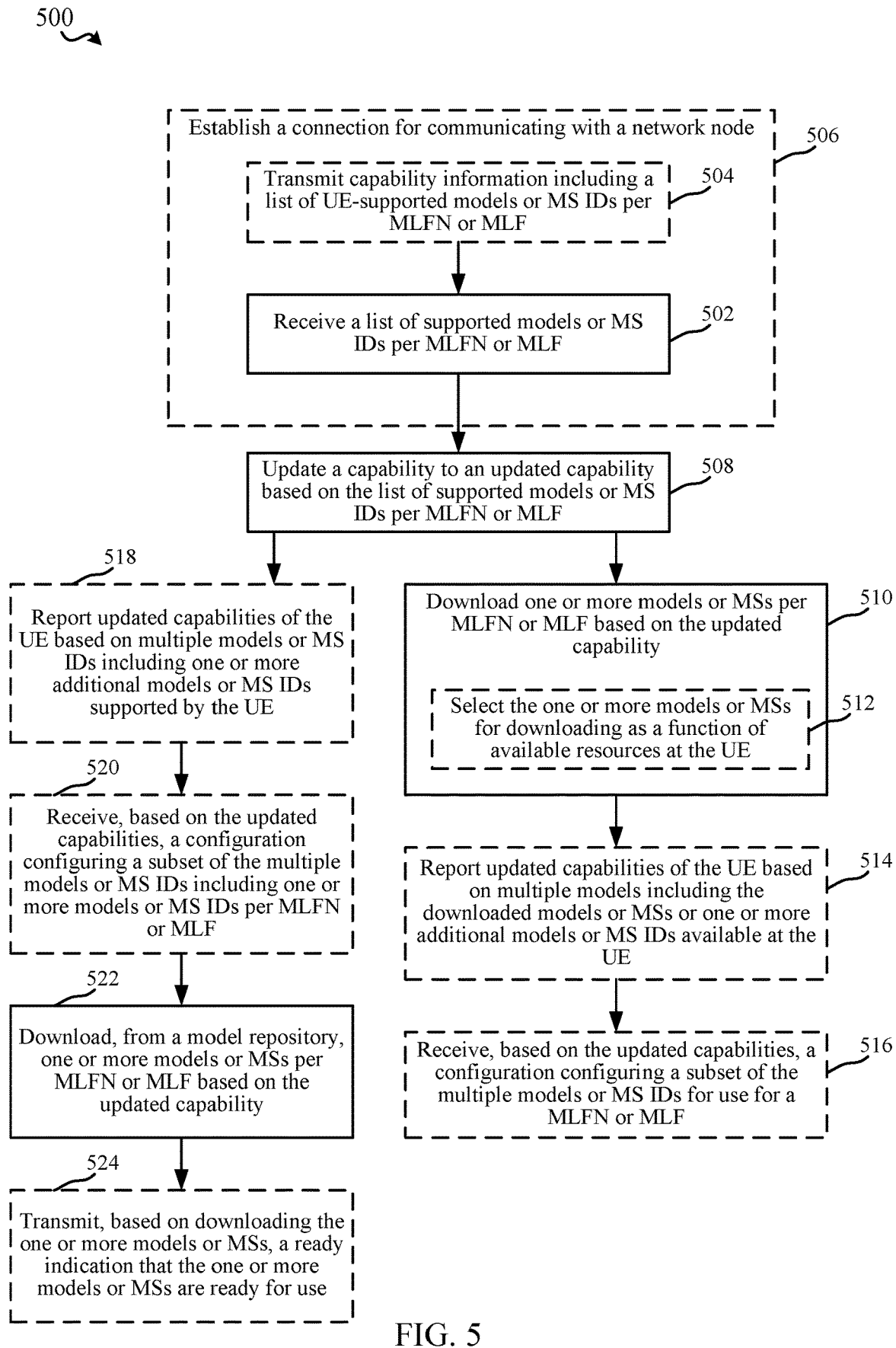
FIG. 5 is a flow chart illustrating an example of a method for downloading models or model structure (MS) identifiers (IDs) supported or to be used for one or more machine learning function names (MLFNs) or machine learning features (MLFs), in accordance with aspects described herein.
Figure 6:
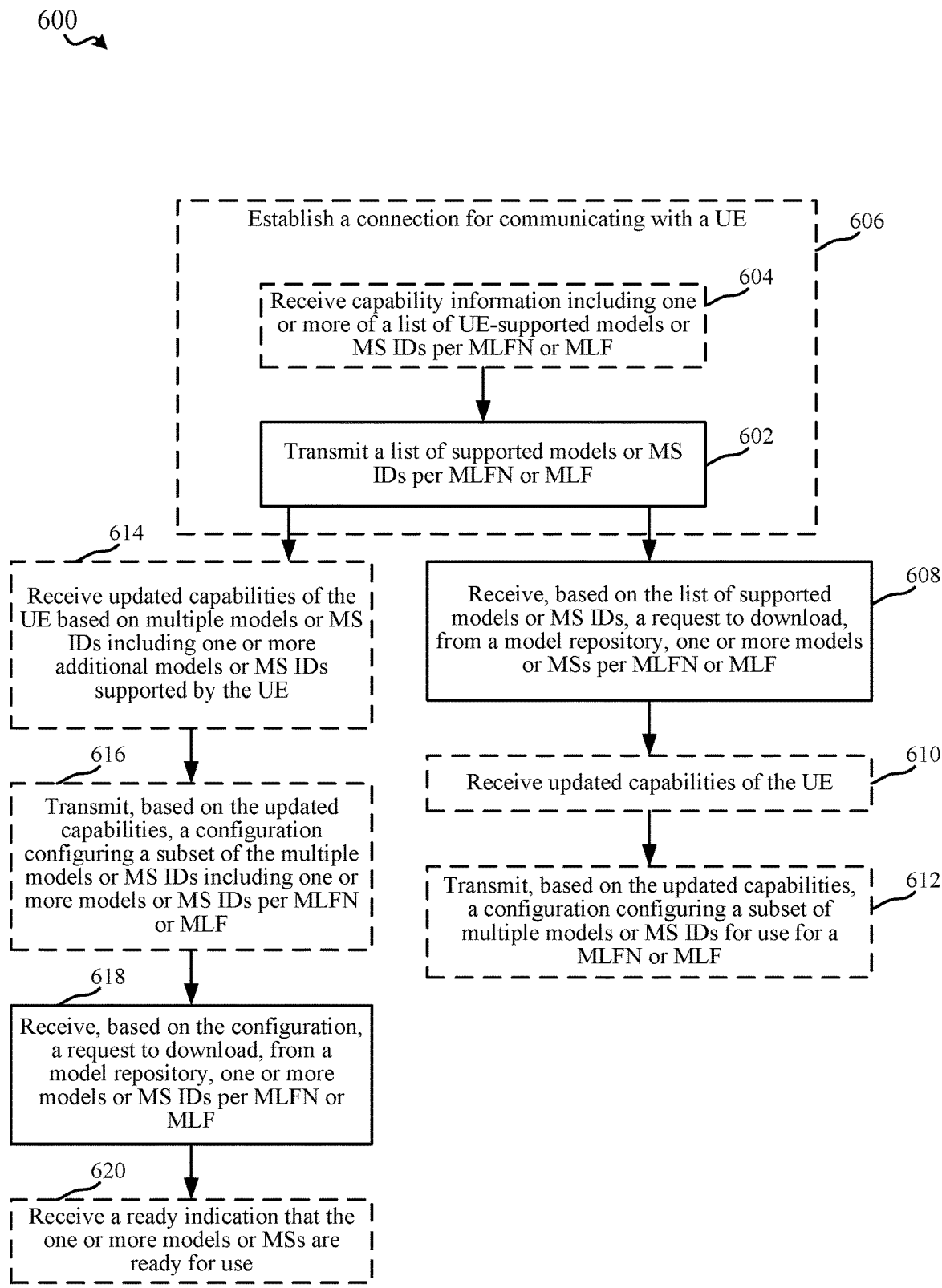
FIG. 6 is a flow chart illustrating an example of a method for configuring a node to download models or MS IDs supported or to be used for one or more MLFNs or MLFs, in accordance with aspects described herein.

FIG. 5 illustrates a flow chart of an example of a method 500 for downloading models or MS IDs supported or to be used for one or more MLFNs or MLFs, in accordance with aspects described herein. FIG. 6 illustrates a flow chart of an example of a method 600 for configuring a node to download models or MS IDs supported or to be used for one or more MLFNs or MLFs, in accordance with aspects described herein. In an example, a UE 104 can perform the functions described in method 500 using one or more of the components described in FIGS. 1 and 3. In an example, a network node, such as a base station 102, a gNB, a monolithic base station or gNB, a portion of a disaggregated base station or gNB, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, a list of supported models or MS IDs per MLFN or MLF can be transmitted. In an aspect, model indicating component 452, e.g., in conjunction with processor(s) 412, memory 416, transceiver 402, BS communicating component 442, etc., can transmit the list of supported models or MS IDs per MLFN or MLF. For example, model indicating component 452 can transmit the list of supported models to a UE 104 in dedicated signaling (e.g., downlink control information (DCI) or other transmission over a physical downlink control channel (PDCCH), physical downlink shared channel (PDSCH), etc.), system information (SI) broadcast, multicast broadcast services (MBS) signaling, and/or the like. In one example, the list of supported models or MS IDs may also indicate a priority of the models or MSs for a given MLFN or MLF.

In method 500, at Block 502, a list of supported models or MS IDs per MLFN or MLF can be received. In an aspect, capability component 352, e.g., in conjunction with processor(s) 312, memory 316, transceiver 302, UE communicating component 342, etc., can receive (e.g., from a network node) the list of supported models or MS IDs per MLFN or MLF. For example, capability component 352 can receive the list of supported models in dedicated signaling (e.g., DCI or other transmission over a PDCCH, PDSCH, etc.), SI broadcast, MBS signaling, or other radio resource control (RRC) layer signaling, and/or the like. In one example, the list of supported models or MS IDs may also indicate a priority of the models or MSs for a given MLFN or MLF.

In an example, model indicating component 452 may filter the list based on an initial UE capability information indicated to the network node. For example, in method 600, optionally at Block 604, a capability information including one or more of a list of UE-supported models or MS IDs per MLFN or MLF. In an aspect, model indicating component 452, e.g., in conjunction with processor(s) 412, memory 416, transceiver 402, BS communicating component 442, etc., can receive (e.g., from a UE 104) a capability information, which may include one or more of a list of UE-supported models or MS IDs per MLFN or MLF. For example, model indicating component 452 can receive the capability information in uplink signaling (e.g., uplink control information (UCI) or other transmission by the UE 104 in a physical uplink control channel (PUCCH), physical uplink shared channel (PUSCH), etc.), remaining minimum system information (RMSI) over RRC layer signaling, and/or the like.

Similarly, for example, in method 500, optionally at Block 504, a capability information including one or more of a list of UE-supported models or MS IDs per MLFN or MLF. In an aspect, capability component 352, e.g., in conjunction with processor(s) 312, memory 316, transceiver 302, UE communicating component 342, etc., can transmit (e.g., to a network node) a capability information, which may include one or more of a list of UE-supported models or MS IDs per MLFN or MLF. For example, capability component 352 can transmit the capability information in uplink signaling (e.g., UCI or other transmission by the UE 104 in a PUCCH, PUSCH, etc.), RMSI over RRC layer signaling, and/or the like.

In one example, communicating the list of supported models or MS IDs and/or the initial capability information, can be part of establishing a connection (e.g., registration or connection setup) between the UE 104 and network node. For example, in method 600, optionally at Block 606, a connection can be established for communicating with the UE, and transmitting the list of supported models or MS IDs and/or receiving the capability information can be part of establishing the connection. In an aspect, BS communicating component 442, e.g., in conjunction with processor(s) 412, memory 416, transceiver 402, etc., can establish the connection for communicating with the UE 104, which may be based on a random access request received from the UE 104, or may otherwise include communications to establish the connection. Similarly, for example, in method 500, optionally at Block 506, a connection can be established for communicating with the network node, and receiving the list of supported models or MS IDs and/or transmitting the capability information can be part of establishing the connection. In an aspect, UE communicating component 342, e.g., in conjunction with processor(s) 312, memory 316, transceiver 302, etc., can establish the connection for communicating with the network node. For example, UE communicating component 342 can perform a random access procedure or other signaling exchange with the network node, and can transmit the capability information and/or receive the list as part of the signaling exchange or other process performed prior to or as part of receiving resource grants from the network node for communicating therewith.

Upon establishing the connection and based on the received UE capability information form the UE, the network can transmit a list of supported model or MS IDs per MLFN or MLF at the network node. The list of supported models or MS IDs transmitted by the network may additionally include a list of one or more newly developed models or MS IDs per MLFN or MLF deployed or registered at a network. In an example, the one or more newly developed models or MS IDs per MLFN or MLF deployed or registered at the network may include UE vendor specific models or MS IDs per MLFN or MLF deployed or registered at the network, network vendor specific models or MS IDs per MLFN or MLF deployed or registered at the network, or third-party models or MS IDs per MLFN or MLF deployed or registered at the network. In one example, the network node may be within a validity area of the one or more models or MS IDs, which can be determined by the network based on registration or deployment information.

Based on receiving the list of supported models or MS IDs, for example, the UE 104 can update is capabilities based on the list received from the network node. For example, in method 500, at Block 508, a capability can be updated to an updated capability based on the list of supported models or MS IDs per MLFN or MLF. In an aspect, capability component 352, e.g., in conjunction with processor(s) 312, memory 316, transceiver 302, UE communicating component 342, etc., can update the capability of the UE 104 to an updated capability based on the list of supported models or MS IDs per MLFN or MLF. For example, capability component 352 can update the capability of the UE 104 to use one or more updated or newly developed models or MSs, or models or MSs deployed or registered at the network, as described above. As such, for example, capability component 352 can locally update the capability to include a support for, request for, preference for, etc., the one or more updated or newly developed models or MSs, or models or MSs deployed or registered at the network, or other models or MSs supported by the UE, etc. This can facilitate use and/or download of the corresponding models or MSs from the MR to the UE 104, as described further herein.

In one example, the UE 104 can download models or MSs to use for one or more MLFNs or MLFs out-of-band, which can include the UE downloading models for a new network in conjunction with updating capabilities at the UE. In this example, in method 500, at Block 510, one or more models or MSs per MLFN or MLF can be downloaded based on the updated capability. In an aspect, model downloading component 354, e.g., in conjunction with processor(s) 312, memory 316, transceiver 302, UE communicating component 342, etc., can download, e.g., from a MR, one or more models or MSs per MLFN or MLF based on the updated capability. As described, for example, capability component 352 can update the capability of the UE 104 as far as which models or MS IDs the UE 104 can support or prefers or desired to use. In one example, model downloading component 354 can attempt to download these models or MSs, e.g., from the MR, which may also include downloading associated PSs in some examples.

In one example, in downloading the models or MSs at Block 510, optionally at Block 512, the one or more models or MSs can be selected for downloading as a function of available resources at the UE. In an aspect, model downloading component 354, e.g., in conjunction with processor(s) 312, memory 316, transceiver 302, UE communicating component 342, etc., can select the one or more models or MSs for downloading as a function of available resources at the UE. For example, the resource may include processing resources, storage or memory resources, hardware acceleration resources, etc. In an example, model downloading component 354 can select the one or more models or MSs for download based on resource capacity (e.g., an amount of resources configured at the UE 104) or capability (and amount of available resources at the UE 104). For example, capability component 352 can generate and/or prioritize a list of models or MS IDs per MLFN or MLF based on the updated capability, and model downloading component 354 can select the models or MSs to download based on the generated or prioritized list (e.g., according to list priority until available resources reserved for the models or MSs are utilized). In one example, capability component 352, in updating the capability, can obtain resource utilization information for the models or MSs in the list, and model downloading component 354 can use this information to determine which models or MSs can be selected for download to comply with the available resources.

In method 600, at Block 608, a request to download, from a MR, one or more models or MS IDs per MLFN or MLF based on the list of supported models or MS IDs can be received. In an aspect, BS communicating component 442, e.g., in conjunction with processor(s) 412, memory 416, transceiver 402, etc., can receive (e.g., from the UE 104), based on the list of supported models or MS IDs, the request to download, from a MR, the one or more models or MS IDs per MLFN or MLF. In an example, BS communicating component 442 can forward the request to the MR for the UE 104 so the UE 104 can download the one or more models or MSs.

In method 500, optionally at Block 514, updated capabilities of the UE can be reported based on multiple models including the downloaded models or MSs or one or more additional models or MS IDs available at the UE. In an aspect, capability component 352, e.g., in conjunction with processor(s) 312, memory 316, transceiver 302, UE communicating component 342, etc., can report (e.g., to the network node) updated capabilities of the UE based on the multiple models including the downloaded models or MSs or one or more additional models or MS IDs available at the UE. For example, capability component 352 can transmit an indication of the updated capabilities to the network node in UCI or other PUCCH or PUSCH transmission.

In method 600, optionally at Block 610, updated capabilities of the UE can be received. In an aspect, model indicating component 454, e.g., in conjunction with processor(s) 412, memory 416, transceiver 402, BS communicating component 442, etc., can receive (e.g., from the UE 104) the updated capabilities of the UE, which may include an indication of models or MS IDs stored at the UE 104, which may include the recently downloaded models or MSs and/or other additional models or MSs available at the UE. For example, model indicating component 454 can receive an indication of the updated capabilities in UCI or other PUCCH or PUSCH transmission.

In method 600, optionally at Block 612, a configuration configuring a subset of multiple models or MS IDs for use for a MLFN or MLF can be transmitted based on the updated capabilities. In an aspect, model selecting component 454, e.g., in conjunction with processor(s) 412, memory 416, transceiver 402, BS communicating component 442, etc., can transmit (e.g., to the UE 104), based on the updated capabilities, the configuration configuring the subset of multiple models or MS IDs for use for a MLFN or MLF. For example, model selecting component 454 can transmit the configuration indicating which model or MS ID to use for each given MLFN or MLF. For example, model selecting component 454 can select which model or MS the UE 104 is to use for a given MLFN or MLF based on one or more considerations, which may include a model priority indicated by the UE 104, a preference of the network node for a certain model or MS (e.g., which may be based on resource utilization or other considerations at the network node), etc. For example, model selecting component 454 can transmit the configuration using DCI, media access control (MAC) control element (CE), or RRC signaling, etc.

In method 500, optionally at Block 516, a configuration configuring a subset of multiple models or MS IDs for use for a MLFN or MLF can be received based on the updated capabilities. In an aspect, model utilizing component 356, e.g., in conjunction with processor(s) 312, memory 316, transceiver 302, UE communicating component 342, etc., can receive (e.g., from the network node), based on the updated capabilities, the configuration configuring the subset of multiple models or MS IDs for use for a MLFN or MLF. In an example, model utilizing component 356 can accordingly configure the models or MS IDs for use per MLFN or MLF, and the UE 104 can use the models in performing the MLFN or MLF, as described. For example, model selecting component 454 can receive the configuration in DCI, media access control (MAC) control element (CE), or RRC signaling, etc.

In another example, the UE 104 can download models or MSs to use for one or more MLFNs or MLFs on-demand, which can include the UE downloading models for a new network when configured by the network for use. In this example, in method 500, at Block 518, updated capabilities of the UE can be reported based on multiple models or MS IDs including one or more additional models or MS IDs supported by the UE. In an aspect, capability component 352, e.g., in conjunction with processor(s) 312, memory 316, transceiver 302, UE communicating component 342, etc., can report (e.g., to the network node) updated capabilities of the UE based on multiple models or MS IDs including one or more additional models or MS IDs supported by the UE. For example, capability component 352 can update the capabilities, as described above, based on the list of supported models or MS IDs, and can report the updated capability to the network node, which can indicate support for the multiple models, which may include one or more additional models or MS IDs based on the received list (e.g., which may not have been in the initial capability information transmitted a Block 504). For example, capability component 352 can transmit the updated capabilities in UCI or other PUCCH or PUSCH transmission.

In method 600, optionally at Block 614, updated capabilities of the UE can be received based on multiple models or MS IDs including one or more additional models or MS IDs supported by the UE. In an aspect, model indicating component 454, e.g., in conjunction with processor(s) 412, memory 416, transceiver 402, BS communicating component 442, etc., can receive (e.g., from the UE 104) the updated capabilities of the UE based on multiple models or MS IDs including one or more additional models or MS IDs supported by the UE, which may include an indication of models or MS IDs stored at the UE 104, which may include the recently downloaded models or MSs and/or other additional models or MSs available at the UE. For example, model indicating component 454 can receive an indication of the updated capabilities in UCI or other PUCCH or PUSCH transmission.

In method 600, optionally at Block 616, a configuration configuring a subset of multiple models or MS IDs including one or more models or MS IDs per MLFN or MLF can be transmitted based on the updated capabilities. In an aspect, model selecting component 454, e.g., in conjunction with processor(s) 412, memory 416, transceiver 402, BS communicating component 442, etc., can transmit (e.g., to the UE 104), based on the updated capabilities, the configuration configuring the subset of multiple models or MS IDs including one or more models or MS IDs per MLFN or MLF. For example, model selecting component 454 can transmit the configuration indicating which model or MS ID to use for each given MLFN or MLF. For example, model selecting component 454 can select which model or MS the UE 104 is to use for a given MLFN or MLF based on one or more considerations, which may include a model priority indicated by the UE 104, a preference of the network node for a certain model or MS (e.g., which may be based on resource utilization or other considerations at the network node), etc.

In method 500, optionally at Block 520, a configuration configuring a subset of multiple models or MS IDs including one or more models or MS IDs per MLFN or MLF can be received based on the updated capabilities. In an aspect, model utilizing component 356, e.g., in conjunction with processor(s) 312, memory 316, transceiver 302, UE communicating component 342, etc., can receive (e.g., from the network node), based on the updated capabilities, the configuration configuring the subset of multiple models or MS IDs including the one or more models or MS IDs per MLFN or MLF. In an example, model utilizing component 356 can accordingly configure the models or MS IDs for use per MLFN or MLF for downloading on-demand.

In method 500, at Block 522, one or more models or MSs per MLFN or MLF can be downloaded, from a MR, based on the updated capability. In an aspect, model downloading component 354, e.g., in conjunction with processor(s) 312, memory 316, transceiver 302, UE communicating component 342, etc., can download, from the MR, the one or more models or MSs per MLFN or MLF based on the updated capability. For example, model downloading component 354 can download the one or more models or MSs indicated in the configuration received from the network node. In an example, as described in Block 512, the downloading of the one or more models or MSs may also be based on resource capacity or availability at the UE 104. For example, where the configuration indicates multiple models or MS IDs (per MLFN or MLF), model downloading component 354 may download a subset of the models or MSs based on resource availability at the UE, as described above.

In method 600, at Block 618, a request to download, from a MR, one or more models or MS IDs per MLFN or MLF based on the configuration can be received. In an aspect, BS communicating component 442, e.g., in conjunction with processor(s) 412, memory 416, transceiver 402, etc., can receive (e.g., from the UE 104), based on the configuration, the request to download, from a MR, the one or more models or MS IDs per MLFN or MLF. In an example, BS communicating component 442 can forward the request to the MR for the UE 104 so the UE 104 can download the one or more models or MSs. The UE 104 can use one or more of the downloaded models or MSs for a corresponding MLFN or MLF, and/or the network node may use or determine parameter values for the MLFN or MLF based on the downloaded models or MSs.

In method 500, optionally at Block 524, a ready indication that the one or more models or MSs are ready for use can be transmitted based on downloading the one or more models or MSs. In an aspect, model utilizing component 356, e.g., in conjunction with processor(s) 312, memory 316, transceiver 302, UE communicating component 342, etc., can transmit, based on downloading the one or more models or MSs, the ready indication that the one or more models or MSs are ready for use. For example, model utilizing component 356 can transmit the indication once the models or MSs are downloaded, and the model utilizing component 356 can use the models or MSs for the corresponding MLFN or MLF. For example, model utilizing component 356 can transmit the ready indication in UCI, MAC-CE, RRC signaling, etc.

In method 600, optionally at Block 620, a ready indication that the one or more models or MSs are ready for use can be received. In an aspect, model selecting component 454, e.g., in conjunction with processor(s) 412, memory 416, transceiver 402, BS communicating component 442, etc., can receive the ready indication that the one or more models or MSs are ready for use. For example, model selecting component 454 can receive the ready indication from the UE 104 once the UE 104 has downloaded and can start using the one or more models or MSs for a given MLFN or MLF. The network node can accordingly start using the MLFN or MLF to receive or interpret parameters received from the UE 104 as part of the corresponding MLFN or MLF. For example, model selecting component 454 can receive the ready indication in UCI, MAC-CE, RRC signaling, etc.

Figure 7:
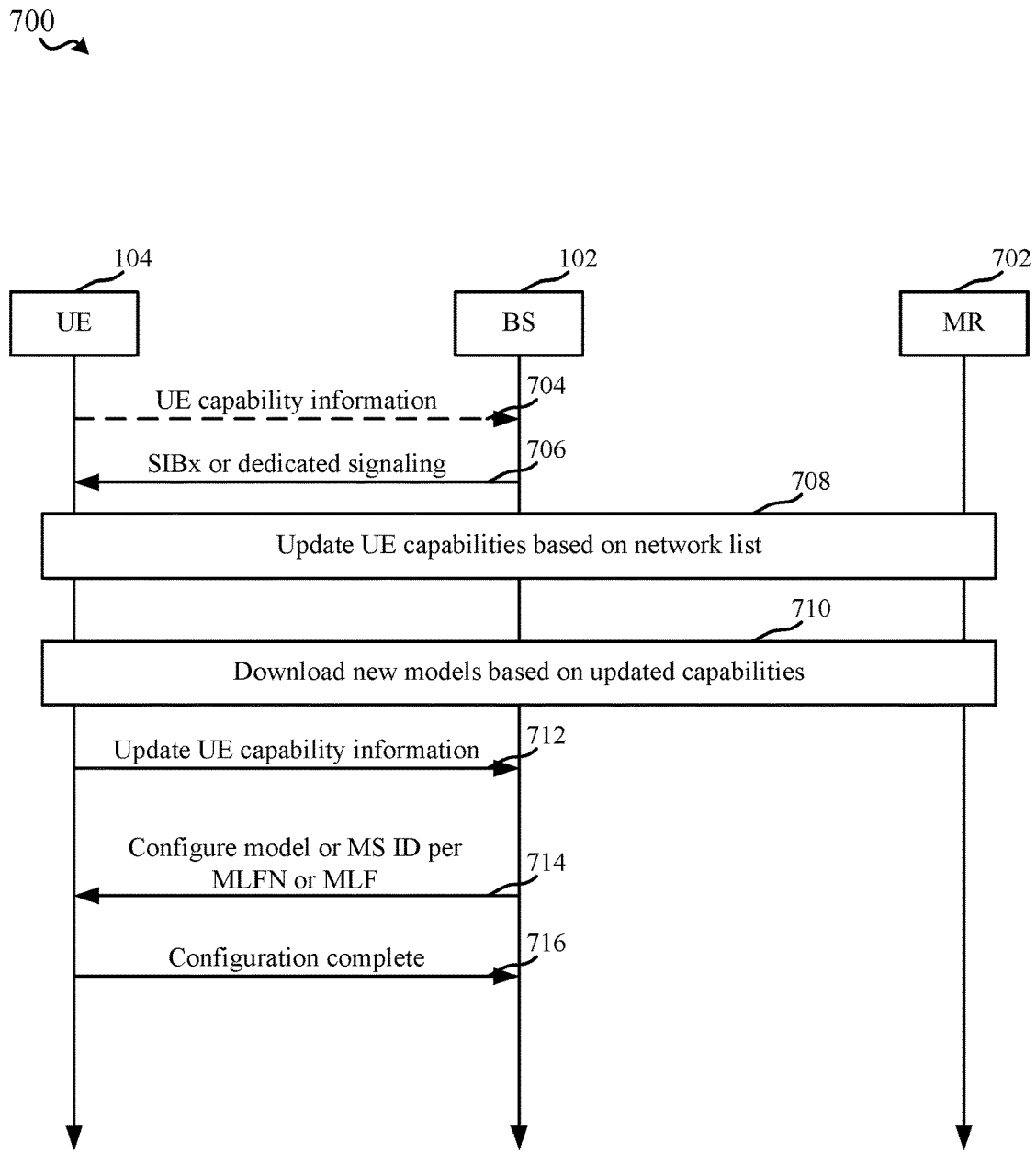
FIG. 7 illustrates an example of a system for out-of-band model downloads and model update at the UE.

FIG. 7 illustrates an example of a system 700 for out-of-band model downloads and model update at the UE. For example, system 700 may include a UE 104, a base station 102, and a MR 702. The UE 104 can access the MR 702 via the base station 102. In this example, UE 104 can optionally transmit UE capability information to the base station 102 at 704, which can indicate a list of UE-supported models or MS IDs per MLFN or MLF. The base station 102 can transmit a SIBx (e.g., a system information block with index x) or dedicated signaling to the UE 104 at 706, which can indicate a network list of models or MS IDs supported per MLFN and/or may include a priority for the models or MS IDs. In one example, the network list may be filtered based on the initial UE capability information. Moreover, as described, the UE capability information can be transmitted, and/or the network list can be received, as part of the UE 104 performing registration or connection setup with the base station 102.

UE 104 can locally update the UE capabilities based on the network list at 708, and can use the updated capabilities to download corresponding models or MSs from the MR 702 at 710. In one example, the UE 104 can download the models or MSs from the MR 702 as a function of available storage or other resources at the UE. Once models or MSs are downloaded, the UE 104 can update the UE capability information to the base station 102 at 712 to indicate the downloaded and otherwise locally stored models and MSs at the UE 104 per MLFN or MLF. The base station 102 can select and configure one or more of the models or MSs per MLFN or MLF to the UE 104 at 714, and the UE 104 can accordingly configure the one or more models or MSs and indicate configuration complete to the base station 102 at 716. The UE 104 and base station 102 can accordingly use the one or more models or MSs for performing the specific MLFN or MLF.

Figure 8:
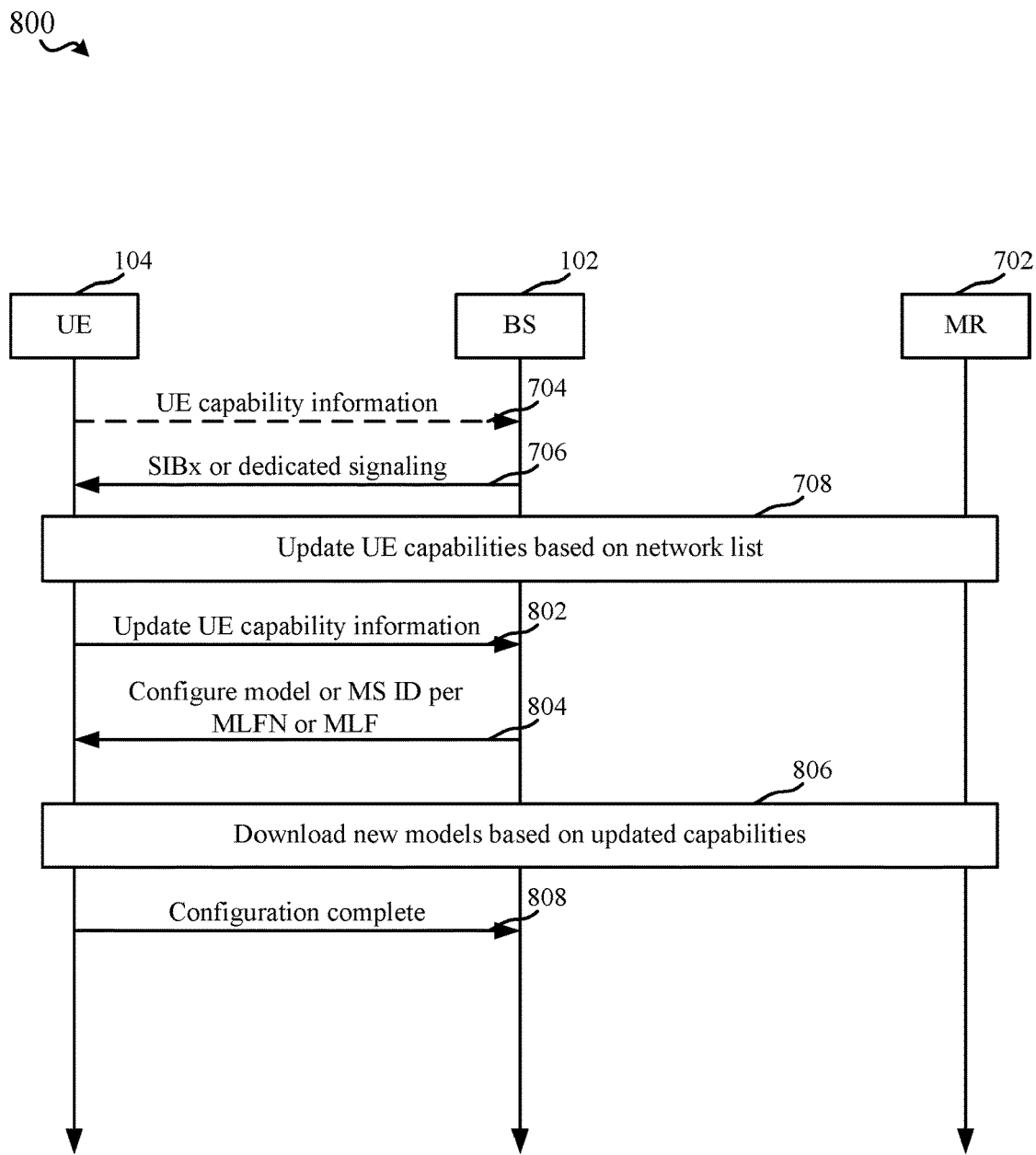
FIG. 8 illustrates an example of a system for on-demand model downloads and model update at the UE.

FIG. 8 illustrates an example of a system 800 for on-demand model downloads and model update at the UE. For example, system 800 may include a UE 104, a base station 102, and a MR 702. The UE 104 can access the MR 702 via the base station 102. In this example, UE 104 can optionally transmit UE capability information to the base station 102 at 704, which can indicate a list of UE-supported models or MS IDs per MLFN or MLF. The base station 102 can transmit a SIBx (e.g., a system information block with index x) or dedicated signaling to the UE 104 at 704, which can indicate a network list of models or MS IDs supported per MLFN and/or may include a priority for the models or MS IDs. In one example, the network list may be filtered based on the initial UE capability information. Moreover, as described, the UE capability information can be transmitted, and/or the network list can be received, as part of the UE 104 performing registration or connection setup with the base station 102.

UE 104 can locally update the UE capabilities based on the network list at 708, and can send updated UE capability information based on the network list to the base station 102 at 802. The base station 102 can configure a model or MS ID per MLFN or MLF reported by the UE 104 at 804. The UE 104 can download the configured model or MS from the MR 702 at 806, which may be a function of resource availability at the UE 104. The UE 104 can accordingly configure the one or more models or MSs and indicate configuration complete to the base station 102 at 808. The UE 104 and base station 102 can accordingly use the one or more models or MSs for performing the specific MLFN or MLF.

Figure 9:
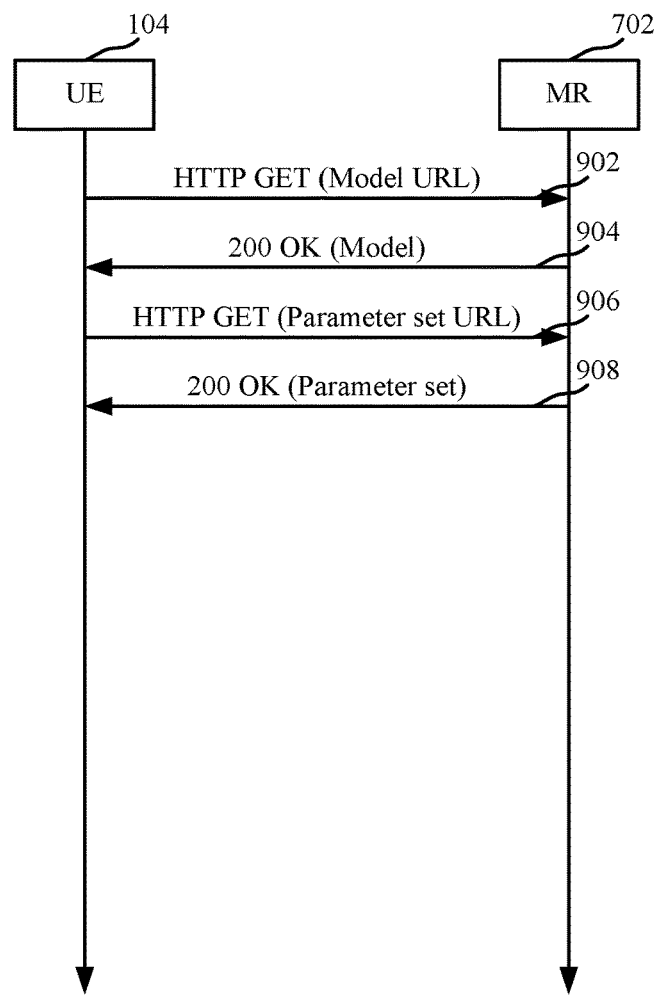
FIG. 9 illustrates an example of a system for model download by a UE.

FIG. 9 illustrates an example of a system 900 for model download by a UE, in accordance with aspects described herein (such as FIG. 5 at Blocks 510 and 522, FIG. 7 at 710, FIG. 8 at 806). For example, system 900 may include a UE 104 and a MR 702. The UE 104 can access the MR 702 via a base station and/or other network nodes (not shown). A network operator can provision models at the MR 702 for download and/or use by one or more UEs. In one example, the models may optionally be hosted by a third-party and access by the network operator via the third-party. The MR 702 can store model and parameter sets as an executable (e.g., the third party can convert the model for the specific UE) or as a standardized descriptor that the UE can interpret (e.g., open neural network exchange (ONNX)). Based on its capabilities, as described, UE 104 can construct resource locators (e.g., universal resource locators (URLs)) of model and/or parameter sets with model identifier and/or parameter set identifiers as input, which may be based on a defined rule. In another example, the UE 104 can be configured with a policy of rules for generating the URLs.

For example, the UE 104 can transmit a request (e.g., HTTP GET) to the MR 702 for a model URL at 902, and can receive a response (e.g., 200 OK) with the requested model at 904. The UE 104 can also transmit a request (e.g., HTTP GET) to the MR 702 for a parameter set at 906, and can receive a response (e.g., 200 OK) with the requested parameter set at 908. In an example, the requests can include secure hypertext transfer protocol (HTTP), stream control transmission protocol (SCTP), file transfer protocol (FTP), or similar user plane requests by the UE 104. The UE 104 can cache frequently used models and/or parameter sets (e.g., similar to SIB caching where version tag and timer can be used to ensure freshness of the cached parameter sets).

Figure 10:
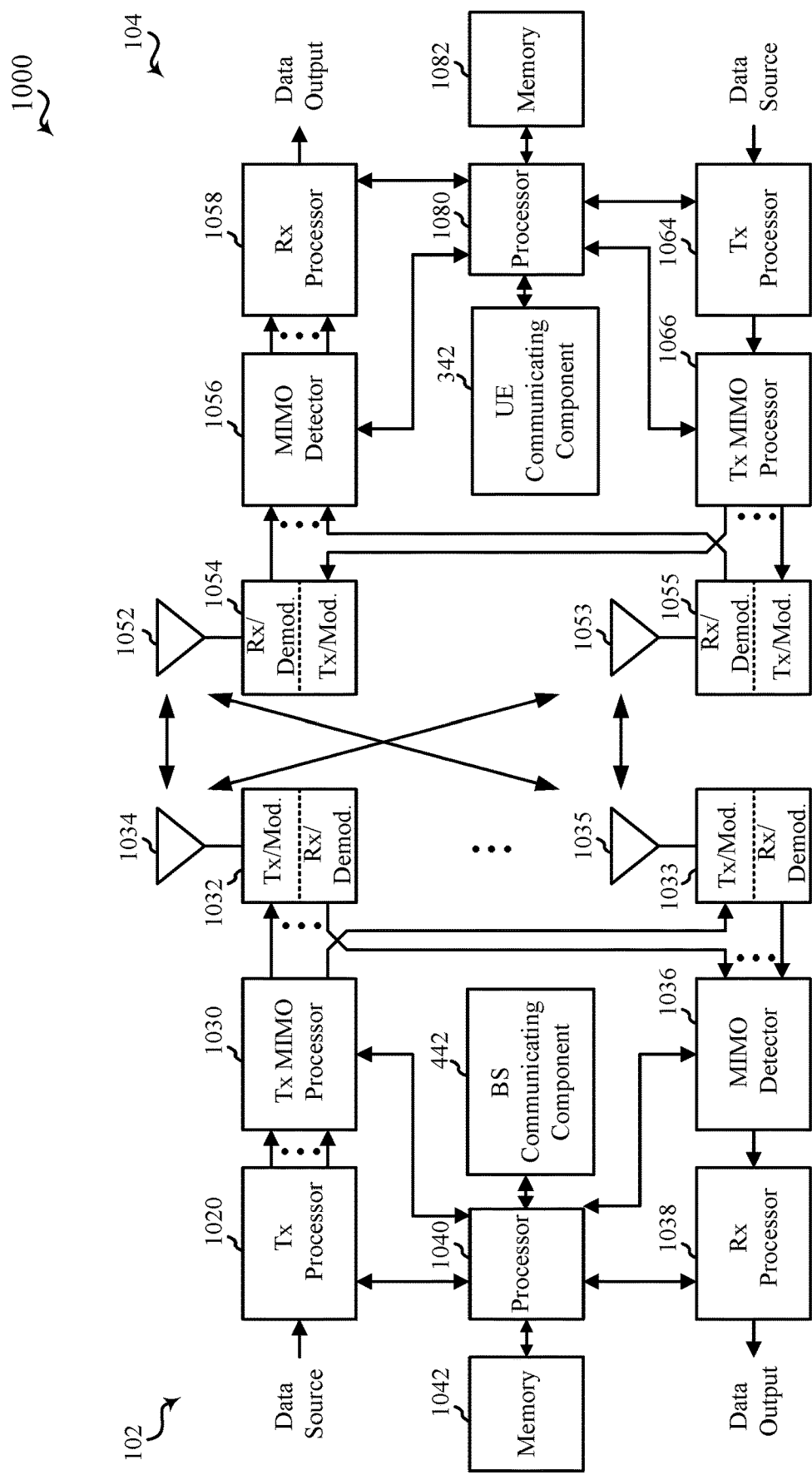
FIG. 10 is a block diagram illustrating an example of a multiple-input multiple-output (MIMO) communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1 and 3. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a UE communicating component 342 (see e.g., FIGS. 1 and 3).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for single carrier-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication at a UE including receiving, from a network node, a list of supported models or MS IDs per MLFN or MLF at the network node, updating a capability at the UE to an updated capability based on the list of supported models or MS IDs per MLFN or MLF at the network node, and downloading, at the UE and from a model repository, one or more models or MSs per MLFN or MLF based on the updated capability and available resources at the UE.

In Aspect 2, the method of Aspect 1 includes where receiving the list of supported models or MS IDs per MLFN or MLF from the network node is based on transmitting, to the network node, capability information including a list of UE-supported models or MS IDs per MLFN or MLF and list of one or more newly developed models or MS IDs per MLFN or MLF deployed or registered at a network.

In Aspect 3, the method of Aspect 2 includes where the one or more newly developed models or MS IDs per MLFN or MLF deployed or registered at the network include one or more of UE vendor specific models or MS IDs per MLFN or MLF deployed or registered at the network, network vendor specific models or MS IDs per MLFN or MLF deployed or registered at the network, or third-party models or MS IDs per MLFN or MLF deployed or registered at the network, where the network node is within a validity area of the one or more models or MS IDs.

In Aspect 4, the method of any of Aspects 1 to 3 includes establishing a connection for communicating with the network node, where receiving the list of supported models or MS IDs per MLFN or MLF at the network node is part of establishing the connection.

In Aspect 5, the method of any of Aspects 1 to 4 includes reporting, to the network node, further updated capabilities of the UE based on multiple models including the one or more models or MSs downloaded from the model repository or additional models or MS IDs available at the UE.

In Aspect 6, the method of Aspect 5 includes receiving, from the network node and based on the updated capabilities, a configuration configuring a subset of the multiple models or MS IDs per MLFN or MLF to use for an MLFN or MLF at the UE.

In Aspect 7, the method of Aspect 6 includes where the configuration is received over RRC signaling.

In Aspect 8, the method of any of Aspects 1 to 7 includes reporting, to the network node, the updated capability of the UE based on the list of supported models or MS IDs per MLFN or MLF at the network node.

In Aspect 9, the method of Aspect 8 includes receiving, from the network node and based on the updated capability, a configuration configuring at least a subset of the one or more models or MS IDs per MLFN or MLF to use for an operation at the UE, where downloading the one or more models or MSs is based on the configuration.

In Aspect 10, the method of Aspect 9 includes transmitting, based on downloading the one or more models or MSs, a ready indication that the one or more models or MSs are ready for use at the UE.

In Aspect 11, the method of Aspect 10 includes where the ready indication is transmitted using a RRC message, MAC CE, or UCI.

In Aspect 12, the method of any of Aspects 1 to 11 includes where receiving the list of supported models or MS IDs per MLFN or MLF at a network node is via dedicated signaling for the UE, SI or using MBS.

In Aspect 13, the method of any of Aspects 1 to 12 includes where the list of supported models or MS IDs at a network node includes multiple lists of supported models or MS IDs per MLFN or MLF.

In Aspect 14, the method of any of Aspects 1 to 13 includes where downloading the one or more models includes constructing a resource locator for the one or more models or MSs, and for a parameter set for the one or more models or MSs based on the MS IDs, transmitting, to the model repository, a request for downloading one or more models or MSs and the parameter set, and receiving, from the model repository, the one or more models or MSs and the parameter set based on the request.

In Aspect 15, the method of Aspect 14 includes where the request for downloading the model is transmitted over user plane using a secure HTTP, SCTP, or FTP.

In Aspect 16, the method of any of Aspects 14 or 15 includes caching the one or more models or the parameter set at the UE.

Aspect 17 is a method for wireless communication at a network node including transmitting, for a UE, a list of supported models or MS IDs per MLFN or MLF at the network node, receiving, for the UE and based on the list of supported models or MS IDs, a request to download, from a model repository, one or more models or MSs based on the list of supported models or MS IDs at the network node.

In Aspect 18, the method of Aspect 17 includes where transmitting the list of supported models or MS IDs at the network node is based on receiving, from the UE, capability information including a list of UE-supported models or MS IDs and a list of one or more newly developed models or MS IDs per MLFN or MFN deployed or registered in the network, where the network node is within a validity area of the one or more newly developed models or MS IDs.

In Aspect 19, the method of Aspect 18 includes where the one or more newly developed models or MS IDs per MLFN or MLF deployed or registered at the network include one or more of UE vendor specific models or MS IDs per MLFN or MLF deployed or registered at the network, network vendor specific models or MS IDs per MLFN or MLF deployed or registered at the network, or third-party models or MS IDs per MLFN or MLF deployed or registered at the network, where the network node is within a validity area of the one or more models or MS IDs.

In Aspect 20, the method of any of Aspects 17 to 19 includes establishing a connection for communicating with the UE, where transmitting the list of supported models or MS IDs at the network node is part of establishing the connection.

In Aspect 21, the method of any of Aspects 17 to 20 includes receiving, from the UE, a report of updated capabilities of the UE based on the one or more models or MSs downloaded from the model repository, and transmitting, to the UE and based on the updated capabilities, a configuration configuring a subset of the one or more models or MSs to use for an operation.

In Aspect 22, the method of any of Aspects 17 to 21 includes receiving, from the UE and based on the list of supported models or MS IDs, a report of updated capabilities of the UE based on multiple models or MS IDs including one or more additional models or MS IDs supported by the UE.

In Aspect 23, the method of Aspect 22 includes transmitting, to the UE and based on the updated capabilities, a configuration configuring a subset of the multiple models or MS IDs, where receiving the request to download the one or more models or MSs is based on the configuration.

In Aspect 24, the method of Aspect 23 includes where the configuration is transmitted over RRC signaling.

In Aspect 25, the method of any of Aspects 22 to 24 includes receiving, based on downloading the one or more models or MSs, a ready indication that the one or more models or MSs are ready for use at the UE.

In Aspect 26, the method of Aspect 25 includes where the ready indication is received using a RRC message, MAC CE, or UCI.

In Aspect 27, the method of any of Aspects 17 to 26 includes where transmitting the list of supported models or MS IDs is via dedicated signaling for the UE, SI or using MBS.

Aspect 28 is an apparatus for wireless communication including a processor, memory coupled with the processor, and instructions stored in the memory and operable, when executed by the processor, to cause the apparatus to perform any of the methods of Aspects 1 to 27.

Aspect 29 is an apparatus for wireless communication including means for performing any of the methods of Aspects 1 to 27.

Aspect 30 is a computer-readable medium including code executable by one or more processors for wireless communications, the code including code for performing any of the methods of Aspects 1 to 27.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a processor;
   memory coupled with the processor; and
   instructions stored in the memory and operable, when executed by the processor, to cause the apparatus to:
      receive, from a network node, a list of supported models or model structures (MS) identifiers (IDs) per machine learning function name (MLFN) or machine learning feature (MLF) at the network node;
      update a capability at the apparatus to an updated capability based on the list of supported models or MS IDs per MLFN or MLF at the network node; and
      download, from a model repository, one or more models or MSs per MLFN or MLF based on the updated capability and available resources at the apparatus.

2. The apparatus of claim 1, wherein the instructions, when executed by the processor, cause the apparatus to receive the list of supported models or MS IDs per MLFN or MLF from the network node based on transmitting, to the network node, capability information including a list of UE-supported models or MS IDs per MLFN or MLF and list of one or more newly developed models or MS IDs per MLFN or MLF deployed or registered at a network.

3. The apparatus of claim 2, wherein the one or more newly developed models or MS IDs per MLFN or MLF deployed or registered at the network include one or more of UE vendor specific models or MS IDs per MLFN or MLF deployed or registered at the network, network vendor specific models or MS IDs per MLFN or MLF deployed or registered at the network, or third-party models or MS IDs per MLFN or MLF deployed or registered at the network, wherein the network node is within a validity area of the one or more models or MS IDs.

4. The apparatus of claim 1, wherein the instructions, when executed by the processor, cause the apparatus to establish a connection for communicating with the network node, wherein the instructions, when executed by the processor, cause the apparatus to receive the list of supported models or MS IDs per MLFN or MLF at the network node as part of establishing the connection.

5. The apparatus of claim 1, wherein the instructions, when executed by the processor, cause the apparatus to report, to the network node, further updated capabilities of the apparatus based on multiple models including the one or more models or MSs downloaded from the model repository or additional models or MS IDs available at the apparatus.

6. The apparatus of claim 5, wherein the instructions, when executed by the processor, cause the apparatus to receive, from the network node and based on the updated capabilities, a configuration configuring a subset of the multiple models or MS IDs per MLFN or MLF to use for an MLFN or MLF at the apparatus.

7. The apparatus of claim 6, wherein the configuration is received over radio resource control (RRC) signaling.

8. The apparatus of claim 1, wherein the instructions, when executed by the processor, cause the apparatus to report, to the network node, the updated capability of the apparatus based on the list of supported models or MS IDs per MLFN or MLF at the network node.

9. The apparatus of claim 8, wherein the instructions, when executed by the processor, cause the apparatus to receive, from the network node and based on the updated capability, a configuration configuring at least a subset of the one or more models or MS IDs per MLFN or MLF to use for an operation at the apparatus, wherein the instructions, when executed by the processor, cause the apparatus to download the one or more models or MSs based on the configuration.

10. The apparatus of claim 9, wherein the instructions, when executed by the processor, cause the apparatus to transmit, based on downloading the one or more models or MSs, a ready indication that the one or more models or MSs are ready for use at the apparatus.

11. The apparatus of claim 10, wherein the ready indication is transmitted using a radio resource control (RRC) message, a media access control (MAC) control element (CE), or uplink control information (UCI).

12. The apparatus of claim 1, wherein the instructions, when executed by the processor, cause the apparatus to receive the list of supported models or MS IDs per MLFN or MLF at a network node via dedicated signaling for the apparatus, system information (SI) or using multicast broadcast services (MBS).

13. The apparatus of claim 1, wherein the list of supported models or MS IDs at a network node includes multiple lists of supported models or MS IDs per MLFN or MLF.

14. The apparatus of claim 1, wherein the instructions, when executed by the processor, cause the apparatus to download the one or more models at least in part by:
   constructing a resource locator for the one or more models or MSs, and for a parameter set for the one or more MSs based on the MS IDs;
   transmitting, to the model repository, a request for downloading one or more models or MSs and the parameter set; and
   receiving, from the model repository, the one or more models or MSs and the parameter set based on the request.

15. The apparatus of claim 14, wherein the request for downloading the model is transmitted over user plane using a secure hypertext transfer protocol (HTTP), stream control transmission protocol (SCTP), file transfer protocol (FTP).

16. The apparatus of claim 14, wherein the instructions, when executed by the processor, cause the apparatus to cache the one or more models or the parameter set at the apparatus.

17. An apparatus for wireless communication, comprising:
a processor;
memory coupled with the processor; and
instructions stored in the memory and operable, when executed by the processor, to cause the apparatus to:
transmit, for a user equipment (UE), a list of supported models or model structures (MS) identifiers (IDs) per machine learning function name (MLFN) or machine learning feature (MLF) at the apparatus; and
receive, for the UE and based on the list of supported models or MS IDs, a request to download, from a model repository, one or more models or MSs based on the list of supported models or MS IDs at the apparatus.

18. The apparatus of claim 17, wherein the instructions, when executed by the processor, cause the apparatus to transmit the list of supported models or MS IDs at the apparatus based on receiving, from the UE, capability information including a list of UE-supported models or MS IDs and a list of one or more newly developed models or MS IDs per MLFN or MFN deployed or registered in the network, wherein the apparatus is within a validity area of the one or more newly developed models or MS IDs.

19. The apparatus of claim 18, wherein the one or more newly developed models or MS IDs per MLFN or MLF deployed or registered at the network include one or more of UE vendor specific models or MS IDs per MLFN or MLF deployed or registered at the network, network vendor specific models or MS IDs per MLFN or MLF deployed or registered at the network, or third-party models or MS IDs per MLFN or MLF deployed or registered at the network, wherein the apparatus is within a validity area of the one or more models or MS IDs.

20. The apparatus of claim 17, wherein the instructions, when executed by the processor, cause the apparatus to establish a connection for communicating with the UE, wherein the instructions, when executed by the processor, cause the apparatus to transmit the list of supported models or MS IDs at the apparatus as part of establishing the connection.

21. The apparatus of claim 17, wherein the instructions, when executed by the processor, cause the apparatus to:
receive, from the UE, a report of updated capabilities of the UE based on the one or more models or MSs downloaded from the model repository; and
transmit, to the UE and based on the updated capabilities, a configuration configuring a subset of the one or more models or MSs to use for an operation.

22. The apparatus of claim 17, wherein the instructions, when executed by the processor, cause the apparatus to receive, from the UE and based on the list of supported models or MS IDs, a report of updated capabilities of the UE based on multiple models or MS IDs including one or more additional models or MS IDs supported by the UE.

23. The apparatus of claim 22, wherein the instructions, when executed by the processor, cause the apparatus to transmit, to the UE and based on the updated capabilities, a configuration configuring a subset of the multiple models or MS IDs, wherein the instructions, when executed by the processor, cause the apparatus to receive the request to download the one or more models or MSs based on the configuration.

24. The apparatus of claim 23, wherein the configuration is transmitted over radio resource control (RRC) signaling.

25. The apparatus of claim 22, wherein the instructions, when executed by the processor, cause the apparatus to receive, based on downloading the one or more models or MSs, a ready indication that the one or more models or MSs are ready for use at the UE.

26. The apparatus of claim 25, wherein the ready indication is received using a radio resource control (RRC) message, a media access control (MAC) control element (CE), or uplink control information (UCI).

27. The apparatus of claim 17, wherein the instructions, when executed by the processor, cause the apparatus to transmit the list of supported models or MS IDs via dedicated signaling for the UE, system information (SI) or using multicast broadcast services (MBS).

28. A method for wireless communication at a user equipment (UE), comprising:
receiving, from a network node, a list of supported models or model structures (MS) identifiers (IDs) per machine learning function name (MLFN) or machine learning feature (MLF) at the network node;
updating a capability at the UE to an updated capability based on the list of supported models or MS IDs per MLFN or MLF at the network node; and
downloading, at the UE and from a model repository, one or more models or MSs per MLFN or MLF based on the updated capability and available resources at the UE.

29. The method of claim 28, wherein receiving the list of supported models or MS IDs per MLFN or MLF from the network node is based on transmitting, to the network node, capability information including a list of UE-supported models or MS IDs per MLFN or MLF and list of one or more newly developed models or MS IDs per MLFN or MLF deployed or registered at a network.

30. A method for wireless communication at a network node, comprising:
transmitting, for a user equipment (UE), a list of supported models or model structures (MS) identifiers (IDs) per machine learning function name (MLFN) or machine learning feature (MLF) at the network node; and
receiving, for the UE and based on the list of supported models or MS IDs, a request to download, from a model repository, one or more models or MSs based on the list of supported models or MS IDs at the network node.

* * * * *